United States Patent [19]
Tajima

[11] Patent Number: 5,710,845
[45] Date of Patent: Jan. 20, 1998

[54] ALL-OPTICAL SWITCH

[75] Inventor: Kazuhito Tajima, Tokyo, Japan

[73] Assignee: NEC Corporation, Japan

[21] Appl. No.: 580,061

[22] Filed: Dec. 20, 1995

[30] Foreign Application Priority Data

Dec. 22, 1994 [JP] Japan ................................ 6-320801

[51] Int. Cl.[6] ............................................. G02B 6/26
[52] U.S. Cl. ............................ 385/16; 385/3; 385/11
[58] Field of Search .................................. 385/3, 4, 5, 8, 385/11, 16, 27, 28, 20; 359/117, 139, 248; 250/227.19

[56] References Cited

U.S. PATENT DOCUMENTS

| | | | |
|---|---|---|---|
| 5,117,471 | 5/1992 | Furstenau | 385/16 |
| 5,305,136 | 4/1994 | Smith | 385/8 |
| 5,307,428 | 4/1994 | Blow et al. | 385/11 |
| 5,317,658 | 5/1994 | Bergland et al. | 385/16 |
| 5,455,877 | 10/1995 | Baran et al. | 385/11 |

FOREIGN PATENT DOCUMENTS 7-20510  1/1995  Japan .

OTHER PUBLICATIONS

M.J. LaGasse et al., "Ultrafast switching with a single–fiber interferometer", Optics Letters, Mar. 15, 1989, vol. 14, No. 6, pp. 311–313.

M.J. LaGasse et al., "Femtosecond all–optical switching in AlGaAs waveguides using a time division interferometer", May 22, 1989, vol. 54, No. 21, pp. 2068–2070.

R.J. Manning, et al., "Enhanced recovery rates in semiconductor laser amplifiers using optical pumping", Electronic Letters, May 12, 1994, vol. 30, No. 10, pp. 787–788.

S. Nakamura, et al., "Experimental Investigation on High–Speed Switching Characteristics Of A Novel Symmetric Mach–Zehnder All–Optical Switch", Applied Physics Letters, vol. 65, No. 3, Jul. 18, 1994, pp. 283–285.

Primary Examiner—Rodney B. Bovernick
Assistant Examiner—Hemang Sanghavi
Attorney, Agent, or Firm—Ostrolenk, Faber, Gerb & Soffen, LLP

[57] ABSTRACT

The invention provides an all-optical switch including (a) polarizing beam splitters for introducing propagation time difference A to vertically and horizontally polarized components of a signal light, (b) a semiconductor waveguide for impressing phase modulation to the signal light; (c) a polarizing beam splitter and mirrors for introducing propagation time difference B, which is opposite to said propagation time difference A, to the vertically and horizontally polarized components of the signal light, (d) a half-wave plate for making polarization of the vertically and horizontally polarized components to coincide with each other, and (e) a half mirror for making the vertically and horizontally polarized components to interfere with each other. The all-optical switch in accordance with the invention has advantages that switch-off time is not limited by the slow longitudinal relaxation time of non-linear effects, and that it has long term stability because it includes only one non-linear portion.

18 Claims, 3 Drawing Sheets

ALL-OPTICAL SWITCH

BACKGROUND OF THE INVENTION

1. Field of the Invention

The invention relates to an all-optical switch for directly controlling light with light, and more particularly to a ultra-fast all-optical switch to be used as an optical control element in the field of optical-fiber communication and optical data processing.

2. Description of the Related Art

It is absolutely necessary for high-speed operation of optical-fiber communication and optical data processing system to increase operation speed of elements to be used for optical control. A conventional optical control element has used the electro-optic control method in which optical control is carried out by electrical signals. These days, the all-optical system in which optical control is carried out by a light has attracted attention as a method which enables higher speed operation of optical elements. The all-optical control system has many advantages such as that the operation speed thereof is not dependent on CR time constant of a circuit, and that it is possible to directly utilize optical pulses which enables to generate ultra-shorter pulses than electrical pulses.

However, there still remain bars to overcome for accomplishing an all-optical device to be used in the above mentioned all-optical control system. In particular, it is necessary for accomplishing an all-optical device to concurrently fulfill performances required for an all-optical device, low power characteristic, high transmittance to a signal light, and high repetition switching speed. As to the performances required for an all-optical device, they include those that a route of a signal light can be changed by a control light, and that cascading such devices can be made. There are two methods which would fulfill the requirement for the above mentioned performances; a Mach-Zehnder type waveguide element and a directional coupler type waveguide element. It is considered that the Mach-Zehnder type waveguide element is superior to the directional coupler type waveguide element because the operation of the former needs only half of optical power required for the operation of the latter.

The operation of an all-optical device is based on non-linear refractive index changes regardless of configuration of the all-optical device. In other words, the rate and/or efficiency of the non-linear refractive index changes determines operation speed and energy of an all-optical device. Non-linear optical phenomena accompanying non-linear refractive index changes can be grouped into several groups; first of all, they are grouped as to whether they are resonantly enhanced phenomena or not. It is considered that the present technology could provide an all-optical device which is able to work at ultra-high repetition rate on the order of THz, if the purely nonresonant effects are utilized. However, the bar in such an all-optical device is that it needs significantly high optical power.

Thus, it is considered to reduce optical intensity by taking advantage of the resonant enhancement. The resonantly enhanced effects can be grouped as to whether they are coherent effects or not. For the purpose of accomplishing ultra-fast response, it is desirable to utilize the coherent effects, because the response time thereof is not dependent on longitudinal relaxation time of electronic system. Herein, the coherent effects mean the effects in which the correlation between a phase of a wave function of electronic system and a phase of a light is strictly maintained while a light interacts with a matter. The coherent effects occur on the condition that a pulse width of a light is shorter than the phase relaxation time of a matter which is, for instance, in the range of 0.1 to 0.2 picoseconds in bulk GaAs at room temperature. If a pulse width of a light is longer than the phase relaxation time, real carrier generation occurs. The occurrence of real carrier generation requires excited electrons to longitudinally relax and, while reduces the operation speed of an all-optical device, and prevents occurrence of the coherent effects. If a pulse width of a light is shorter than the phase relaxation time, it is considered that the real carrier generation occurs due to two photon absorption and so on.

A higher pulse repetition rate induces more remarkable accumulation of the real carrier generation. Thus, it is considered that a ultra-fast phenomenon, which can be observed with ultra-short pulses at a repetition rate of about 100 MHz generated by a mode-locked laser, will be unable to be observed due to the influence of the real carrier generation, if the repetition rate becomes much higher to exceed the carrier life time. For the above mentioned reasons, it is considered impossible to accomplish an all-optical device which can work at ultra-high repetition rate by utilizing resonantly enhanced coherent effects such as the AC-Stark effect.

On the other hand, the resonant incoherent effects caused by real carrier generation are quite practical, since it is considered that an all-optical device can be operated with low power below 1 Watt. However, the switch-off time or relaxation time of optical non-linear refractive index is dependent on the longitudinal relaxation time or interband recombination time of carrier. Since the interband recombination time is on the order of nanoseconds in GaAs, it is impossible to utilize the high-speed characteristic of a light.

Thus, it is desired to reduce the relaxation time of incoherent effect such as the band-filling effect by any appropriate method. There are considered some methods for increasing speed of the relaxation time of band-filling effect. One of such methods is to introduce recombination centers by proton bombardment and so on. However, this method may deteriorate the non-linearity in certain cases. To increase the speed of relaxation time by surface recombination is efficient to a simple configuration such as etalon, however, there remains doubts about compatibility with a waveguide element, and there is limitation on increasing the speed of relaxation time. At any rate, it is not possible by any of conventional methods to operate an all-optical device on the order of picoseconds at which the high-speed characteristic of a light can be advantageously utilized. In addition, there also remains the problem of deterioration of the non-linearity.

For overcoming the above mentioned problems on the characteristics of non-linear material, there has been suggested a Mach-Zehnder type all-optical device the switch-off time of which is not dependent on the longitudinal relaxation time of non-linearity effects, in Japanese Unexamined Patent Public Disclosure No. 7-20510 which is laid-open since Jan. 24, 1995, and which was invented by the inventor of the present invention and filed by the assignee of the present invention, and also in S. Nakamura, K. Tajima and Y. Sugimoto: Experimental investigation on high-speed switching characteristics of a novel symmetric Mach-Zehnder all-optical switch, Applied Physics Letters, vol. 65, No. 3, pp 283–285, Jul. 18, 1994. It should be noted that the applicant does not admit the above mentioned Japanese Unexamined Patent Public Disclosure No. 7-20510 to be prior art to the present invention, and that it is listed herein merely for better understanding of the present invention.

The Mach-Zehnder type all-optical devices having been suggested in the above publications have overcome the above mentioned problems on the characteristics of non-linear material. However, those all-optical devices require a pair of identical non-linear parts. As a matter of fact, it is quite difficult to fabricate perfectly the same non-linear parts, and thus there still remains another problem that a stabilizing circuit is required in order to compensate for a characteristic difference between the two nonlinear parts.

SUMMARY OF THE INVENTION

It is therefore an object of the present invention to provide an all-optical switch which has a characteristic that the switch-off time thereof is not limited by the slow longitudinal relaxation time of non-linear effects, and which is superior in long-term stability.

It is another object of the present invention to provide a method of optical control utilizing the above mentioned all-optical switch.

The invention provides an all-optical switch including (a) a device for introducing propagation time difference A to vertically and horizontally polarized components of a signal light, (b) a device for impressing phase modulation to the signal light, the device inducing refractive index changes when a control light is applied thereto, (c) a device for introducing propagation time difference B, which is opposite to the propagation time difference A, to the vertically and horizontally polarized components of the signal light, (d) a device for making polarization of the vertically and horizontally polarized components of the signal light to coincide with each other, and (e) a device for making the vertically and horizontally polarized components of the signal light to interfere with each other.

In one aspect, the invention further provides an all-optical switch including (a) a device for splitting a signal light into vertically and horizontally polarized components, (b) a device for introducing propagation time difference A to the vertically and horizontally polarized components, (c) a device for combining the vertically and horizontally polarized components into a single signal light, (d) a device for imparting phase modulation to the signal light, the device inducing refractive index changes when a control light is applied thereto, (e) a device for splitting the signal light into vertically and horizontally polarized components, (f) a device for imparting propagation time difference B, which is opposite to the propagation time difference A, to the vertically and horizontally polarized components of the signal light, (g) a device for making polarization of the vertically and horizontally polarized components of the signal light to coincide with each other, and (h) a device for making the vertically and horizontally polarized components of the signal light to interfere with each other.

The invention still further provides an all-optical switch including (a) a first polarizing beam splitter for splitting a signal light into vertically and horizontally polarized components, (b) a plurality of total reflection mirrors defining an optical path starting from the first polarizing beam splitter for imparting propagation time difference A to the vertically and horizontally polarized components, (c) a second polarizing beam splitter for combining the vertically and horizontally polarized components into a signal light, (d) a semiconductor waveguide for imparting phase modulation to the signal light, the semiconductor waveguide inducing refractive index changes when a control light is applied thereto, (e) a third polarizing beam splitter for splitting the signal light into vertically and horizontally polarized components, (f) combination of a right-angled mirror and a corner cube, the right-angled mirror placed in an optical path of one of the vertically and horizontally polarized component of the signal light, the corner cube disposed so that it receives the one of the component reflected by the right-angled mirror, the combination of a right-angled mirror and a corner cube imparting propagation time difference B, which is opposite to the propagation time difference A, to the vertically and horizontally polarized components of the signal light, (g) a half-wave plate for making polarization of the other of the components to rotate to opposite polarization to coincide the polarization of the components with each other, and (h) a half mirror for making the vertically and horizontally polarized components of the signal light to interfere with each other.

The invention yet further provides an all-optical switch made up of a semiconductor chip, the semiconductor chip including (a) a first TE-TM splitter for splitting a signal light into vertically and horizontally polarized components, (b) a second TE-TM splitter for receiving the split components to combine them into a single beam, (c) a first optical path connecting the first TE-TM splitter to the second TE-TM splitter, (d) a second optical path connecting the first TE-TM splitter to the second TE-TM splitter, the second optical path being longer than the first optical path, the split components transmitting through the first and second optical paths to produce propagation time difference A therebetween, (e) a non-linear waveguide for imparting phase modulation to the signal light, the non-linear waveguide inducing refractive index changes when a control light is applied thereto, (f) a third TE-TM splitter for splitting the signal light into TE and TM polarized components, (g) a third optical path for imparting propagation time difference B, which is opposite to the propagation time difference A, to the TE and TM polarized components of the signal light, (h) a TE-TM converter for making polarization of the TE and TM polarized components of the signal light to coincide with each other, and (i) a 3 dB coupler for making the TE and TM polarized components of the signal light to interfere with each other.

In another aspect, the invention provides a method of optical control including the steps of (a) introducing propagation time difference A to vertically and horizontally polarized components of a signal light, (b) impressing phase modulation to the signal light by introducing the signal light to material in which refractive index changes are induced when a control light is applied thereto, (c) introducing propagation time difference B, which is opposite to the propagation time difference A, to the vertically and horizontally polarized components of the signal light, (d) making polarization of the vertically and horizontally polarized components of the signal light to coincide with each other, and (e) making the vertically and horizontally polarized components of the signal light to interfere with each other.

The invention further provides a method of optical control including the steps of (a) splitting a signal light into vertically and horizontally polarized components, (b) introducing propagation time difference A to the vertically and horizontally polarized components, (c) combining the vertically and horizontally polarized components into a single beam, (d) introducing the signal light to material in which refractive index changes are induced when a control light is applied thereto, to impart phase modulation to the signal light, (e) splitting the signal light into vertically and horizontally polarized components, (f) introducing propagation time difference B, which is opposite to the propagation time difference A, to the vertically and horizontally polarized components of the signal light, (g) making polarization of the vertically and horizontally polarized components of the signal light to coincide with each other, and (h) making the vertically and horizontally polarized components of the signal light to interfere with each other.

In the all-optical switch in accordance with the above mentioned invention, the switching speed thereof is not restricted by slow relaxation time by which highly efficient non-linear optical effect is characterized, even if highly efficient band-filling effect is utilized. Thus, it is possible to accomplish ultra-fast optical switching on the order of picoseconds. In addition, the all-optical switch in accordance with the invention requires only one non-linear waveguide unlike the conventional symmetric Mach-Zehnder type all-optical switch, resulting in better, long-term stability. Moreover, highly sensitive non-linear refractive index effect to be utilized in the all-optical switch in accordance with the invention enables the all-optical switch to operate with low power.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
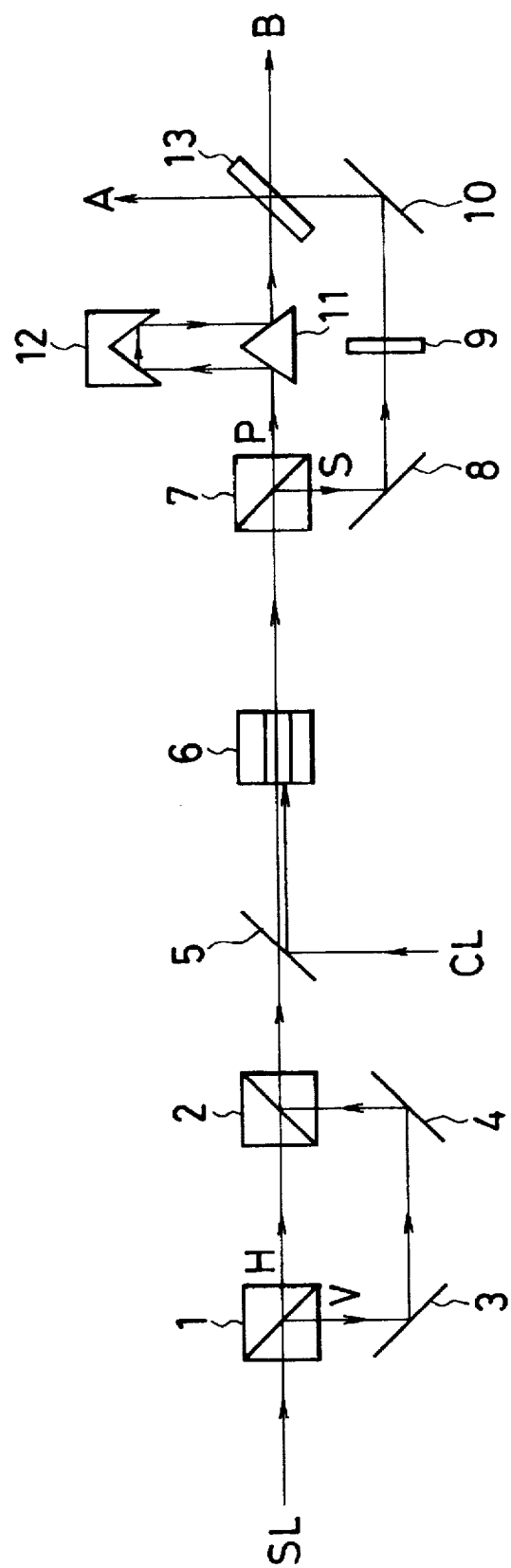
FIG. 1 is a schematic view illustrating the first embodiment of the all-optical switch in accordance with the invention.

FIG. 1 illustrates the all-optical switch in accordance with the first embodiment of the present invention. On an optical path of a signal light SL, first and second polarizing beam splitters (PBS) 1 and 2 are juxtaposed with each other. Since the signal light SL is polarized at an angle of 45 degrees relative to a plane of FIG. 1, the signal light SL is divided by the first polarizing beam splitter 1 into two components, that is, p-polarized component and s-polarized component. Herein, the horizontally polarized light is corresponding to the p-polarized light in the Ferminology used with the polarizing beam splitter. The p-polarized component is polarized horizontally, namely, in a plane of FIG. 1, and passes through the first polarizing beam splitter 1 and forwards straight to the second polarizing beam splitter 2. The s-polarized component is vertically polarized, and reflected by the first polarizing beam splitter 1. The reflected polarized component is twice reflected by total reflection mirrors 3 and 4, and thus enters the second polarizing beam splitter 2. Thus, the p- and s-polarized components are combined in the second polarizing beam splitter 2.

As is obvious, the s-polarized component ran by different optical length from that of the p-polarized component. Accordingly, the difference in optical length between the p- and s-polarized components induces a propagation time difference between the p- and s-polarized components. This state is shown in FIG. 2-B, in which the p- and s-polarized components are separately illustrated for clarity, though they are combined with each other in fact.

The combined p- and s-polarized components, namely the signal light SL passes through a wavelength selection mirror 5, and then enters a single-mode semiconductor waveguide 6. The semiconductor waveguide 6 consists of GaAs core and AlGaAs claddings. A control light CL is reflected by the wavelength selection mirror 5, and then enters the semiconductor waveguide 6 together with the signal light SL. The signal light SL is selected to have a wavelength of 900 nanometers which is within the transparent wavelength band of the semiconductor waveguide 6, and the control light CL is selected to have a wavelength of 870 nanometers which is within the absorption wavelength band of the semiconductor waveguide 6. The control light CL is made up of ultra-short pulses having a full-width at half-maximum of 1 picosecond. Accordingly, when 1 picosecond has passed after the control pulse entered the semiconductor waveguide 6, photocarriers (electron-hole plasma) are generated in the semiconductor waveguide at spatially averaged density of $3\times10^{16}$/cc. The production of the photocarriers changes a refractive index of the semiconductor waveguide core as shown in FIG. 2-C. This refractive index change is a non-linear one. As a result, the signal light SL passing through the semiconductor waveguide 6 is subject to phase modulation (PM) by $\pi$ radians. Since the photocarriers have a lifetime of 1 nanosecond, the phase modulation is defined by an exponential function in which an initial value is $\pi$ radians and a time constant is 1 nanosecond, to a first approximation. This state is shown in FIG. 2-D. As mentioned above, since the time constant is 1 nanosecond, the phase modulation degree, that is, the carrier density does scarcely change during tens of picoseconds, as shown in FIG. 2.

Figure 2:
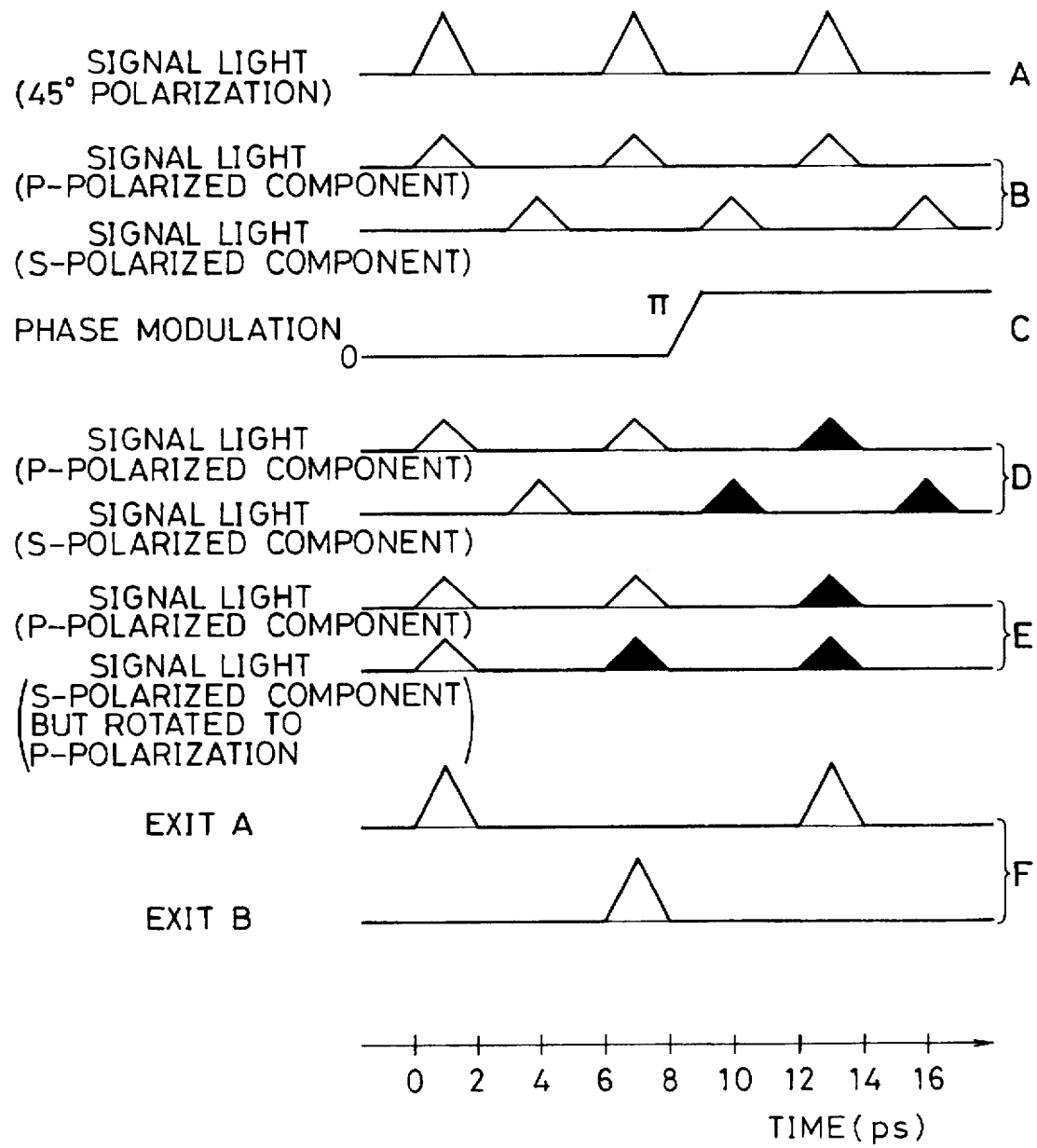
FIG. 2 is a schematic view illustrating waveforms of signal lights for explaining the principle of the first embodiment.

The semiconductor waveguide 6 is excited by the control light CL, and thereby imparts the phase modulation as shown in FIG. 2-C to the signal light SL. As a result, the phase of the signal light SL is changed as shown in FIG. 2-D. In FIG. 2-D, only black pulses are subject to phase shift by $\pi$ radians shown in FIG. 2-C.

The signal light SL having passed the semiconductor waveguide 6 is split again by a third polarizing beam splitter 7 into p- and s-polarized components. The p-polarized component passes through the third polarizing beam splitter 7, while the s-polarized component is reflected by the third polarizing beam splitter 7. On an optical path of the p-polarized component is disposed a triangle-shaped right-angled mirror 11. Above the right-angled mirror 11 is also disposed a corner cube 12 so that it received the p-polarized component reflected by the right-angled mirror 11. The right-angled mirror 11 cooperates with the corner cube 12 to form a light delay circuit. The p-polarized component having passed through the third polarizing component 7 is reflected by the right-angled mirror 11 and the corner cube 12 by four times. Thus, the light delay circuit consisting of the right-angled mirror 11 and the corner cube 12 imparts a propagation time difference to the p- and s-polarized components. It should be noted that the propagation time difference imparted by the light delay circuit is just opposite to the propagation time difference imparted by the pair of the total reflection mirrors 3 and 4 to the signal light SL. The structure of the light delay circuit is not limited to the combination of the right-angled mirror 11 and the corner cube 12. For instance, in place of them, four total reflection mirrors may be used.

The s-polarized component reflected by the third polarizing beam splitter 7 is further reflected by total reflection mirrors 8 and 10. While the s-polarized component forwards from the mirror 8 to the mirror 10, the s-polarized component passes through a half-wave plate 9, thereby the s-polarized component is rotated in polarization to a p-polarized component. This state is shown in FIG. 2-E.

These two components, one of which runs through the right-angled mirror 11 and the corner cube 12 and the other through the total reflection mirror 8, the half-wave plate 9 and the total reflection mirror 10, meet again at a half mirror 13, and interfere with each other. A difference in phase between these components makes signal lights leave the half mirror 13 through different exits. The detail is shown in FIG. 2-F. In detail, since first pulses of the components are not subject to phase modulation, they strengthen each other at an exit A and weaken each other at an exit B as a result of interference of each other. Thus, the first pulses leave the half mirror 13 through the exit A. On the other hand, since one of second pulses of the two components is subject to phase modulation, they have a phase different with each other by π radians. Thus, the state of interference is reversed, and thereby the second pulses leave the half mirror 13 through the exit B. Third pulses are both subject to phase modulation by π radians, and thus they have no difference in phase. Accordingly, the third pulses leave the half mirror 13 through the exit A similarly to the first pulses.

As mentioned earlier, highly sensitive non-linear refractive index changes always accompany slow relaxation time. Though the all-optical switch in accordance with the invention utilizes the non-linear refractive index changes as shown in FIG. 2-C, the all-optical switch makes it possible to accomplish ultra-fast switching. In addition, since the all-optical switch requires only one non-linear portion, which corresponds to the semiconductor waveguide 6 in the above described embodiment, the all-optical switch has an advantage of long-term stability.

Figure 3:
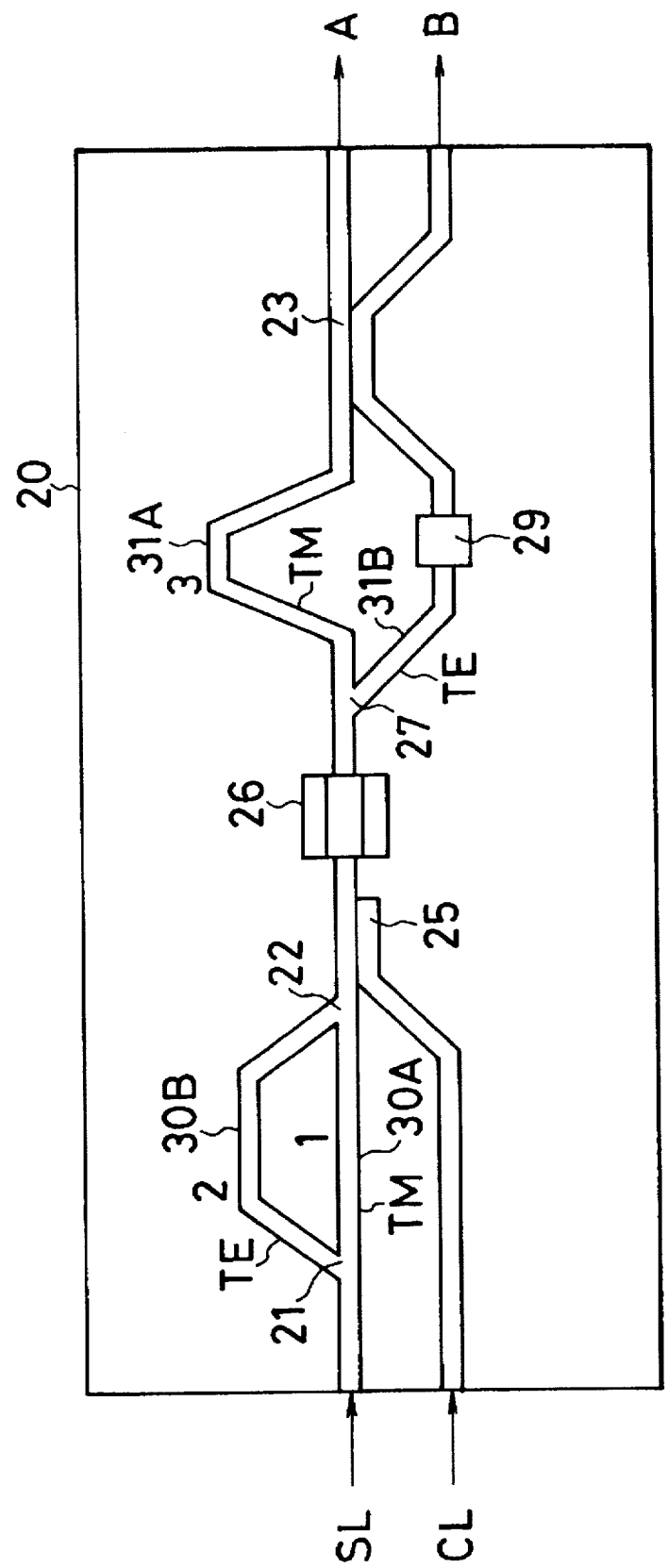
FIG. 3 is a plan view illustrating the second embodiment of the all-optical switch in accordance with the invention.

In the above described first embodiment, the all-optical switch is constructed of various optical components. However, it should be noted that the all-optical switch in accordance with the invention can be constructed also of a semiconductor chip. FIG. 3 illustrates an all-optical switch 20 in accordance with the second embodiment of the present invention, which is made up of a semiconductor chip. The illustrated all-optical switch 20 includes a first TE-TM splitter 21 for splitting a received signal light SL into TE and TM polarized components, and a second TE-TM splitter 22 for receiving the TE and TM polarized components to combine them into a signal light SL again. In case of free space propagation, as in the previous embodiment, the polarization states are designated as p- or s-polarization, but in waveguide they are referred to as TE or TM polarization. The first TE-TM splitter 21 is connected to the second TE-TM splitter 22 through first and second optical paths 30A and 30B through which the TE and TM polarized components are transmitted, respectively. As is illustrated in FIG. 3, the second optical path 30B is designed to be longer than the first optical path 30A. Thus, there is produced a propagation time difference between the TE and TM polarized components.

A control light CL is introduced into the all-optical switch through a wavelength selection coupler 25, and enters a non-linear waveguide 26 together with the signal light SL. The non-linear waveguide 26 induces refractive index changes by the control light CL applied thereto, and thus imparts phase modulation to the signal light SL.

The signal light SL is split again into TE and TM polarized components by a third TE-TM splitter 27. The TM polarized component is transmitted through a third optical path 31A, while the TE polarized component is transmitted through a fourth optical path 31B. The TE polarized component is inverted in polarization to TM polarized component by a TE-TM converter 29 disposed on the fourth optical path. In addition, a difference in optical length between the third and fourth optical paths 31A and 31B imparts a propagation time difference to the TE and TM polarized components. This propagation time difference is just opposite to one imparted by the first and second optical paths 30A and 30B. Then, the TE and TM polarized components interfere with each other at a 3 dB coupler 23, and leaves the all-optical switch 20 through an exit A or B.

The above mentioned elements are all formed on a wafer by etching. The etching is deeper than a core layer, and hence the all-optical switch 20 is designed to be of ridge type. However, it should be noted that the non-linear waveguide 26 may be of other types such as stripe-loaded type.

The non-linear waveguide 26 includes a core having a narrower bandgap than the rest thereof by virtue of selective growth and regrowth. The non-linear waveguide 26 corresponds to the semiconductor waveguide 6 of the first embodiment illustrated in FIG. 1. The TE-TM splitters 21, 22 and 27 correspond to the polarizing beam splitters 1, 2 and 7 of the first embodiment, respectively. Similarly, the wavelength selection coupler 25, the TE-TM converter 29 and the 3 dB coupler 23 correspond to and have the same function as the wavelength selection mirror 5, the half-wave plate 9 and the half mirror 13 of the first embodiment. Thus, the second embodiment illustrated in FIG. 3 has the same operation principle as that of the first embodiment illustrated in FIG. 1. The TE-TM splitters 21, 22 and 27 and the TE-TM converter 29 can be fabricated by arranging a difference in propagation constants of TE and TM modes of waveguides to be a certain value.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

For instance, though GaAs family material is used in the above described embodiments, other materials such as InP, InGaAsP and GaAlAs may be used for each of wavelengths thereof. In addition, though the embodiments utilize non-linear refractive index changes caused by band-filling effect of the semiconductor waveguide, the same effects can be obtained even by utilizing the non-linearity of a semiconductor into which carriers are introduced in the form of current, as suggested by R. J. Manning et al., Electronic Letters, Vol. 30, No. 10, pp 787–788, 1994. Other elements and components may be substituted for the optical elements and components used in the above described embodiments, if they provide the same function and effects as those of the optical elements and components of the embodiments.

What is claimed is:

1. An all-optical switch made up of a semiconductor chip, said semiconductor chip comprising:
   (a) means for introducing propagation time difference A to vertically and horizontally polarized components of a signal light;
   (b) means for impressing phase modulation to said signal light, said means inducing refractive index changes when a control light is applied thereto;

(c) means for introducing propagation time difference B, which is opposite to said propagation time difference A, to said vertically and horizontally polarized components of said signal light;

(d) means for making polarization of said vertically and horizontally polarized components of said signal light to coincide with each other; and (e) means for making said vertically and horizontally polarized components of said signal light to interfere with each other.

2. The all-optical switch as set forth in claim 1, wherein said means (b) comprises a semiconductor waveguide.

3. The all-optical switch as set forth in claim 2, wherein said semiconductor waveguide consists of GaAs core and AlGaAs claddings.

4. An all-optical switch made up of a semiconductor chip, said semiconductor chip comprising:

(a) means for splitting a signal light into vertically and horizontally polarized components;

(b) means for introducing propagation time difference A to said vertically and horizontally polarized components;

(c) means for combining said vertically and horizontally polarized components into a single signal light;

(d) means for imparting phase modulation to said signal light, said means inducing refractive index changes when a control light is applied thereto;

(e) means for splitting said signal light into vertically and horizontally polarized components;

(f) means for imparting propagation time difference B, which is opposite to said propagation time difference A, to said vertically and horizontally polarized components of said signal light;

(g) means for making polarization of said vertically and horizontally polarized components of said signal light to coincide with each other; and (h) means for making said vertically and horizontally polarized components of said signal light to interfere with each other.

5. The all-optical switch as set forth in claim 4, wherein said means (a), (c) and (e) are made up of a polarizing beam splitter (PBS).

6. The all-optical switch as set for in claim 4, wherein said means (b) provides different optical length with said vertically and horizontally polarized components of said signal light.

7. The all-optical switch as set forth in claim 6, wherein said means (b) comprises a plurality of total reflection mirrors defining an optical path starting from said means (a) and terminating at said means (c).

8. The all-optical switch as set forth in claim 4, wherein said means (d) comprises a semiconductor waveguide.

9. The all-optical switch as set forth in claim 8, wherein said semiconductor waveguide consists of GaAs core and AlGaAs claddings.

10. The all-optical switch as set forth in claim 4, wherein said means (f) comprises a right-angled mirror and a corner cube.

11. The all-optical switch as set forth in claim 4, wherein said means (g) comprises a half-wave plate.

12. The all-optical switch as set forth in claim 4, wherein said means (h) comprises a half mirror.

13. An all-optical switch made up of a semiconductor chip, said semiconductor chip comprising:

(a) a first polarizing beam splitter for splitting a signal light into vertically and horizontally polarized components;

(b) a plurality of total reflection mirrors defining an optical path starting from said first polarizing beam splitter for imparting propagation time difference A to said vertically and horizontally polarized components;

(c) a second polarizing beam splitter for combining said vertically and horizontally polarized components into a single signal light;

(d) a semiconductor waveguide for imparting phase modulation to said signal light, said means inducing refractive index changes when a control light is applied thereto;

(e) a third polarizing beam splitter for splitting said signal light into vertically and horizontally polarized components;

(f) combination of a right-angled mirror and a corner cube, said right-angled mirror placed in an optical path of one of said vertically and horizontally polarized component of said signal light, said corner cube disposed so that it receives said one of said component reflected by said right-angled mirror, said combination of a right-angled mirror and a corner cube imparting propagation time difference B, which is opposite to said propagation time difference A, to said vertically and horizontally polarized components of said signal light;

(g) a half-wave plate for making polarization of the other of said components to rotate to opposite polarization to coincide the polarization of said components with each other; and (h) a half mirror for making said vertically and horizontally polarized components of said signal light to interfere with each other.

14. The all-optical switch as set forth in claim 13, wherein said semiconductor waveguide consists of GaAs core and AlGaAs claddings.

15. An all-optical switch made up of a semiconductor chip, said semiconductor chip comprising:

(a) a first TE-TM splitter for splitting a signal light into vertically and horizontally polarized components;

(b) a second TE-TM splitter for receiving said split components to combine them into a single beam;

(c) a first optical path connecting said first TE-TM splitter to said second TE-TM splitter;

(d) a second optical path connecting said first TE-TM splitter to said second TE-TM splitter, said second optical path being longer than said first optical path, said split components transmitting through said first and second optical paths to produce propagation time difference A therebetween;

(e) a non-linear waveguide for imparting phase modulation to said signal light, said non-linear waveguide inducing refractive index changes when a control light is applied thereto;

(f) a third TE-TM splitter for splitting said signal light into vertically and horizontally polarized components;

(g) a third optical path for imparting propagation time difference B, which is opposite to said propagation time difference A, to said vertically and horizontally polarized components of said signal light;

(h) a TE-TM converter for making polarization of said vertically and horizontally polarized components of said signal light to coincide with each other; and (i) a 3 dB coupler for making said vertically and horizontally polarized components of said signal light to interfere with each other.

16. The all-optical switch as set forth in claim 15, wherein said non-linear waveguide comprises a core having a narrower bandgap than the rest of said waveguide.

17. A method of optical control in an all optical switch made up of a semiconductor chip comprising the steps of:
   (a) introducing propagation time difference A to vertically and horizontally polarized components of a signal light;
   (b) impressing phase modulation to said signal light by introducing said signal light to material in which refractive index changes are induced when a control light is applied thereto;
   (c) introducing propagation time difference B, which is opposite to said propagation time difference A, to said vertically and horizontally polarized components of said signal light;
   (d) making polarization of said vertically and horizontally polarized components of said signal light to coincide with each other; and
   (e) making said vertically and horizontally polarized components of said signal light to interfere with each other.

18. A method of optical control in an all optical switch made up of a semiconductor chip comprising the steps of:
   (a) splitting a signal light into vertically and horizontally polarized components;
   (b) introducing propagation time difference A to said vertically and horizontally polarized components;
   (c) combining said vertically and horizontally polarized components into a single beam;
   (d) introducing said signal light to material in which refractive index changes are induced when a control light is applied thereto, to impart phase modulation to said signal light;
   (e) splitting said signal light into vertically and horizontally polarized components;
   (f) introducing propagation time difference B, which is opposite to said propagation time difference A, to said vertically and horizontally polarized components of said signal light;
   (g) making polarization of said vertically and horizontally polarized components of said signal light to coincide with each other; and
   (h) making said vertically and horizontally polarized components of said signal light to interfere with each other.

* * * * *